United States Patent Office 3,555,151
Patented Jan. 12, 1971

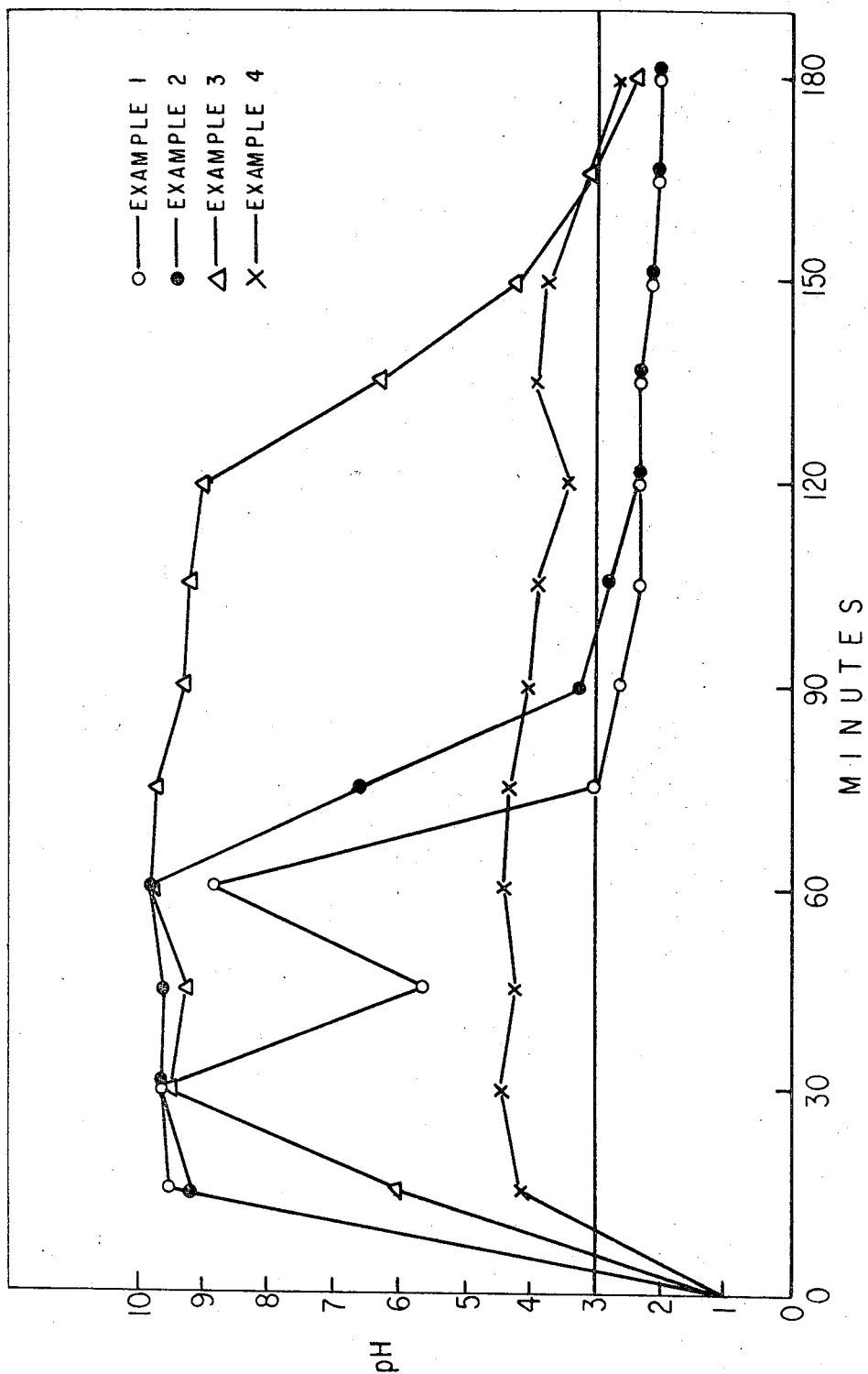

3,555,151
LONG ACTING SOLID ANTACID
Leonard L. Kaplan, Mount Vernon, and Robert H. Cox, Scarsdale, N.Y., assignors to Richardson-Merrell Inc., New York, N.Y., a corporation of Delaware
Continuation-in-part of application Ser. No. 595,736, Nov. 21, 1966. This application Dec. 21, 1966, Ser. No. 609,981
Int. Cl. A61k 27/00
U.S. Cl. 424—156                          9 Claims

ABSTRACT OF THE DISCLOSURE

An antacid composition prepared by intimately admixing: (a) from about 1 to 4 parts of a nontoxic acid counteracting (antacid) compound; (b) about one part of a hydrocolloid; (c) at least 4 parts of water to form an intimate aqueous dispersion of the antacid and hydrocolloid; and (d) finally evaporating the water from the dispersion to form a substantially solid composition wherein the antacid and hydrocolloid are intimately admixed.

---

This is a continuation-in-part of our copending application Ser. No. 595,736, filed Nov. 21, 1966, now abandoned.

This invention relates to antacids and the preparation thereof. More particularly, it relates to solid long acting antacid compositions.

Antacids such as those used to consume the excess acidity of stomach fluids are in common usage. Their purpose is to neutralize or buffer acidity. The antacids, together with various excipients, are effective for various short periods of time but are generally discharged or removed from their intended environment by the passage of fluids therethrough, e.g., discharging of the fluid contents of the stomach into the small intestine.

We have now found an antacid composition and a method for its preparation wherein the composition when in contact with acidic aqueous fluids adheres to the walls of its receptacle over a prolonged period which permits a long acting antacid effect. The composition is prepared by intimately admixing: (a) from about 1 to 4 parts of a nontoxic acid counteracting (antacid) compound; (b) about one part of a hydrocolloid; (c) at least 4 parts of water to form an intimate aqueous dispersion of the antacid and hydrocolloid; and (d) finally evaporating the water from the dispersion to form a substantially composition wherein the antacid and hydrocolloid are intimately admixed. The solid composition is then preferably subdivided and, together with common excipients, formed into quickly disintegratable tablets or placed in water soluble capsules. The admixture of antacid and hydrocolloid is a physical admixture which, upon contact with aqueous acid fluids, swells to a voluminous gelatinous mass. The gelatinous mass adheres to the receptacle, e.g., stomach, and serves to resist the flow of gastric fluids. Since the antacid is intimately admixed with the swellable hydrocolloid, it also remains in place to perform its antacid function.

The drawing, FIG. 1, shows the long acting properties of compositions of this invention wherein the abscissa of the graph shows time in minutes and the ordinate shows pH (hydrogen ion concentration) of laboratory tests. The individual graphs referring to Examples 3 and 4 show compositions of this invention whereas those of Examples 1 and 2 show conventional compositions as more fully explained and shown in the examples and Table I.

The antacid, or acid neutralizing substance, employed in this invention can be any antacid such as the various nontoxic antacids used to neutralize gastric fluids. Illustrative of antacids there can be mentioned the oxide, hydroxide or carbonate of magnesium, aluminum hydroxide, magnesium trisilicate, calcium carbonate, combinations of the foregoing, and the like. A preferred antacid is magnesium oxide alone, or in combinations with other antacids.

The term hydrocolloid as used herein means a colloid having affinity for water, e.g., nontoxic materials such as gums, polysaccharides isolated from water plants, various modified cellulose molecules, proteins, clays, colloidal silica and some totally synthetic products. Illustrative of specifiic hydrocolloids there can be mentioned: gum acacia, gum tragacanth; guar gum, locust bean gum; arabinogalactan; sterculia gum; agar; chondrus; algin; methylcellulose; carboxymethylcellulose; hydroxymethylcellulose; and bentonite. A recent article which discusses hydrocolloids used in pharmaceutical products and which is incorporated herein by reference is: "Hydrocolloids in Cosmetic and Pharmaceutical Dispersions," by B. N. Patel, Drug and Cosmetic Industry, 95, 3 (September 1964), 95, 4 (October 1964) and 95, 6 (December 1964). A preferred hydrocolloid is locust bean gum, also known as Algaroba, the ground meal of the ripe fruit of *Ceratonia siliqua*.

The method of this invention comprises the formation of an intimate aqueous admixture of the antacid and hydrocolloid. A sufficient amount of water, i.e., in a quantity by weight at least 4 times greater than the hydrocolloid, is employed to provide an intimate dispersion of the ingredients, wherein the antacid substance is entrapped within the macromolecular matrix of the hydrocolloid. The minimum quantity of water, in an amount by weight of at least about 4 times greater than the hydrocolloid is critical to ensure intimate dispersion of the ingredients beyond the standard granulation techniques employed in the pharmaceutical art. The quantity of antacid is less critical provided a sufficient quantity is present to effect neutralization of acid. The water is then evaporated from the mixture, e.g., by pouring the dispersion on trays and drying it at a temperature of about 150° F. The dried dispersion is then preferably passed through a comminutor to reduce the dried material to a 12-mesh or finer particle size. The particles are then preferably formulated into quick-disintegrating tablets or capsules according to methods well known in the art. The maximum quantity of water employed is not critical, e.g., it can be much as 5 or 20 parts per part of hydrocolloid. However, if an excess is employed beyond 6 or 8 parts, it simply means that more water will have to be evaporated from the aqueous dispersion without conferring additional benefit to the process or composition. In order to facilitate dispersion of the materials, both the hydrocolloid and the antacid are preferably in powdered form such as that having a particle size of less than about 100 mesh size. In the method of this invention, it appears that the antacid molecules are completely entrapped between the interwined, marco-molecular chains of the hydrocolloid, thereby limiting the mobility of the antacid drug.

Hydrocolloids and antacids have been contacted with water by standard granulation techniques employed in the pharmaceutical art in preparing antacid compositions such as that shown in Example 2 herein. However, the prior art differs in the quantity of water employed and the intimate admixture of hydrocolloid and antacid which is obtained by the method of this invention.

The "parts" of materials given herein are parts by weight, e.g., a dispersion of 1 part of hydrocolloid, 2 parts of antacid and 4 parts of water can be prepared by admixing 1 pound, 2 pounds and 4 pounds, respectively, of the enumerated ingredients. Mesh sizes are given in U.S. Standard Sieve Series.

Since the solid dispersion of antacid and hydrocolloid of this invention is slowly released, additional antacid, for fast or instant action, can be added to a formulation of the intimately dispersed solid antacid and hydrocolloid mixture. Preferably, the antacid for rapid release is added together with some of the hydrocolloid, but is not intimately admixed therewith with large quantities of water with subsequent evaporation of the water, so that this additional antacid and hydrocolloid, although admixed, is not intimately associated with the hydrocolloid. The additional quantities of antacid and hydrocolloid thus employed can preferably vary from about 2% to 10% of antacid, and from about 2% to 10% of the hydrocolloid, respectively, based on the weight of antacid and hydrocolloid treated in accordance with the method of this invention.

In the course of investigating this long-acting antacid composition, an "in vitro" laboratory procedure was developed to determine the rate of acid-buffering activity and the time period during which this activity is continued. A suitable glass chamber sufficient in capacity to accommodate 200 milliliters of simulated gastric fluid (U.S.P. XVII)[1] having a pH of 1.3 was constructed with a stirrer apparatus revolving at a rate of 160 r.p.m. This gastric fluid was maintained at 37° C. body temperature. Two tablets (or capsules) of antacid were placed in the gastric fluid and the stirrer activated. At 15-minute intervals, 25-milliliter aliquot samples of the gastric fluid were removed from the chamber, and the pH determined, using the Beckman Zeromatic pH meter. Following the 30-minute and 60-minute pH readings, the 25-milliliter aliquot samples of gastric fluid from the test chamber were replaced with fresh simulated gastric fluid U.S.P. XVII. Following the 60-minute pH determination, the 25-milliliter aliquot samples were replaced with fresh simulated gastric fluid U.S.P. XVII every 15 minutes until the cutoff period of 180 minutes. The effect of this gastric fluid replacement was the simulation of gastric-emptying movements in the stomach with the introduction of new simulated gastric fluid at the periodic intervals mentioned. This "in vitro" laboratory procedure thus served as a representation of the dynamic nature of the true stomach in the body, and served as the method for the evaluation of the antacid medical composition of this invention. Maintenance of the pH of the gastric fluid above pH 3 was considered indicative of continued acid buffering activity.

EXAMPLE 1

To illustrate the long-acting nature of the antacid medical composition of this invention, as compared to the nature of the antacid drug, per se, gelatin capsules of magnesium oxide were prepared containing 500 milligrams of magnesium oxide per capsule. The formulation and procedure was as follows: Magnesium oxide—500 grams. Pack tightly into number 0 gelatin capsules, placing 500 milligrams of magnesium oxide in each capsule.

EXAMPLE 2

To illustrate the long-acting nature of this invention as compared to a tablet containing the antacid drug in combination with the hydrocolloid processed in the conventional manner known to the pharmaceutical art, tablets were prepared using standard wet granulating procedures illustrated below.

|  | Grams |
|---|---|
| Magnesium oxide (1) | 475 |
| Locust bean gum (1) | 250 |
| Starch | 20 |
| Talcum | 10 |
| Magnesium stearate | 10 |
| Magnesium oxide (2) | 25 |
| Locust bean gum (2) | 15 |

Mix the magnesium oxide (1) and the locust bean gum (1) powders in a suitable container. Granulate with 150 milliliters distilled water to achieve a damp, powder-free granulation. Dry the granulation at 125° F. Reduce to number 12 mesh granules, and add the starch, talcum, magnesium stearate, magnesium oxide (2), and locust bean gum (2). Compress on suitable tablet punches to a tablet weight of 805 milligrams, each tablet containing 500 milligrams of magnesium oxide and 265 milligrams of locust bean gum.

EXAMPLE 3

To illustrate the process for the preparation of the antacid medical composition of this invention, long-acting tablets were prepared using the process of this invention illustrated below.

|  | Grams |
|---|---|
| Magnesium oxide (1) | 475 |
| Locust bean gum (1) | 250 |
| Starch | 20 |
| Talcum | 10 |
| Magnesium stearate | 10 |
| Magnesium oxide (2) | 25 |
| Locust bean gum (2) | 15 |

Mix the magnesium oxide (1) and locust bean gum (1) powders in a suitable container. Place 1500 milliliters of distilled water in a chamber suitable for vigorous agitation, and slowly add the magnesium oxide (1) and locust bean gum (1) powder mix to the distilled water, applying agitation and mixing for one-half hour to completely disperse the powder mix in the water, and ensure the homogeneous admixture of the magnesium oxide with the locust bean gum in the water content. The resultant slurry is poured on trays and dried at 150° F. until solid self-sustaining hard cakelike slabs were formed. Break up these hard slabs, and reduce to number 12 mesh size particles through a comminutor. Add the starch, talcum magnesium stearate, magesium oxide (2) and locust bean gum (2) to the magnesium oxide (1)—locust bean gum (1) particles previously formed, and compress on suitable tablet punches to a tablet weight of 805 milligrams at a compression hardness of 13 kilograms per square inch as determined with the Stokes Tablet Hardness Tester.[1]

EXAMPLE 4

To further illustrate the process for the preparation of the antacid medical composition of this invention, long acting tablets were prepared using the process of this invention illustrated below.

|  | Grams |
|---|---|
| Magnesium oxide (1) | 100.0 |
| Aluminum hydroxide-magnesium carbonate co-precipitate dried gel [1] | 125.0 |
| Locust bean gum (1) | 125.0 |
| Starch | 6.5 |
| Magnesium stearate | 6.0 |
| Magnesium oxide (2) | 25.0 |
| Locust bean gum (2) | 12.5 |

[1] Marketed as FMA-11 by Reheis Division of Armour Chemical Company, Berkeley Heights, N.J.

---

[1] United States Pharmacopeia.

[1] F. J. Stokes Equipment Division of Pennsalt Chemical Company, Philadelphia, Pa.

Mix the magnesium oxide (1), the aluminum hydroxide-magnesium carbonate coprecipitate dried gel, and the locust bean gum (1) in a suitable container. Place 1200 milliliters of distilled water in a chamber suitable for vigorous agitation, and slowly add the magnesium oxide (1), the aluminum hydroxide-magnesium carbonate coprecipitate dried gel, and the locust bean gum (1) powder mix to the distilled water, applying agitation and mixing for one-half hour to completely disperse the powder mix in the water, and ensure the homogeneous admixture of the antacid drugs with the locust bean gum in the water content. The resultant slurry is poured on trays and dried at 150° F. until solid self-sustaining hard cake-like slabs were formed. Break up these hard slabs, and reduce to number 12 mesh size patricles through a comminutor. Add the starch, magnesium sterate, magnesium oxide (2) and locust bean gum (2) to these particles prevously formed, and compress on suitable tablet punches to a tablet weight of 800 milligrams at a compression hardness of 12 kilograms per square inch as determined by the Stokes Hardness Tester.

Table I presents the pH readings at 15-minute intervals of Example 1 (500 milligrams magnesium oxide capsules), Example 2 (500 milligrams magnesium oxide—265 milligrams locust bean gum plus adjuvants conventionally prepared tablets), Example 3 (500 milligrams magnesium oxide—265 milligrams locust bean gum tablets in the composition invention matrix form plus adjuvants) and Example 4 (250 milligrams magnesium oxide—250 milligrams aluminum hydroxide and magnesium carbonate coprecipitate dried gel—275 milligrams locust bean gum tablets in the composition invention matrix form plus adjuvants). FIG. 1 graphically depicts the values of Table I. The procedure employed for obtaining the values is that described hereinbefore for the in vitro laboratory technique.

TABLE I.—pH DETERMINATIONS

| Minutes: | Example 1 | Example 2 | Example 3 | Example 4 |
|---|---|---|---|---|
| 15 | 9.5 | 9.2 | 6.0 | 4.1 |
| 30 | 9.6 | 9.6 | 9.5 | 4.4 |
| 45 | 5.6 | 9.6 | 9.3 | 4.2 |
| 60 | 8.8 | 9.8 | 9.8 | 4.4 |
| 75 | 3.0 | 6.6 | 9.7 | 4.3 |
| 90 | 2.6 | 3.2 | 9.3 | 4.0 |
| 105 | 2.3 | 2.8 | 9.0 | 3.9 |
| 120 | 2.3 | 2.3 | 8.8 | 3.4 |
| 135 | 2.3 | 2.3 | 6.3 | 3.9 |
| 150 | 2.1 | 2.1 | 4.2 | 3.7 |
| 165 | 2.0 | 2.0 | 3.0 | 3.1 |
| 180 | 2.0 | 2.0 | 2.4 | 2.6 |

What is claimed is:
1. A method for preparing a long acting solid antacid composition which comprises: (a) intimately admixing (i) from about 1 to 4 parts of a nontoxic acid-counteracting compound; (ii) about 1 part of locust bean gum; and (iii) at least 4 parts of water to form an intimate aqueous dispersion of said acid counteracting compound and locust bean gum and (b) evaporating the water from said dispersion to form a solid composition containing an intimate homogeneous mixture of said acid counteracting compound and locust bean gum.
2. A method of claim 1 wherein at least 5 parts of water are employed to prepare the aqueous dispersion.
3. A method of claim 2 wherein about 1 part of locust bean gum and about 2 parts of magnesium oxide as the acid counteracting compound are employed.
4. A method of claim 2 wherein about 1 part of locust bean gum and about 1 part of magnesium oxide and about 1 part of aluminum hydroxide-magnesium carbonate coprecipitate dried gel as the acid counteracting compounds are employed.
5. An antacid composition prepared by the method of claim 1.
6. A method for preparing an antacid tablet which comprises: (a) intimately admixing a long acting antacid composition prepared by the process of claim 1 with from about 2% to 10% each of locust bean gum and an antacid, respectively, based on the quantity of said gum and antacid in the long acting composition of claim 1 together with tabletting, disintegrating and binding agents; and (b) finally pressing the mixture of (a) into tablets.
7. An antacid tablet prepared by the method of claim 6.
8. A method of claim 1 wherein the water is evaporated from the dispersion by drying at a temperature of about 150° F.
9. A method of claim 2 wherein the nontoxic acid-counteracting compound and locust bean gum employed have a particle size of less than about 100 mesh according to the U.S. Standard Sieve Series.

References Cited

UNITED STATES PATENTS 2,833,690  5/1958  Entrekin _____ 167—56
3,347,744  10/1967  Latshaw et al. _____ 167—55

FOREIGN PATENTS 289,498  4/1928  Great Britain _____ 424—362

ALBERT T. MEYERS, Primary Examiner

D. M. STEPHENS, Assistant Examiner

U.S. Cl. X.R.
424—157, 361, 363